Sept. 6, 1955            R. H. CLARK            2,717,113
ATTACHMENT FOR SAUSAGE STUFFING MACHINES
Filed Jan. 24, 1952
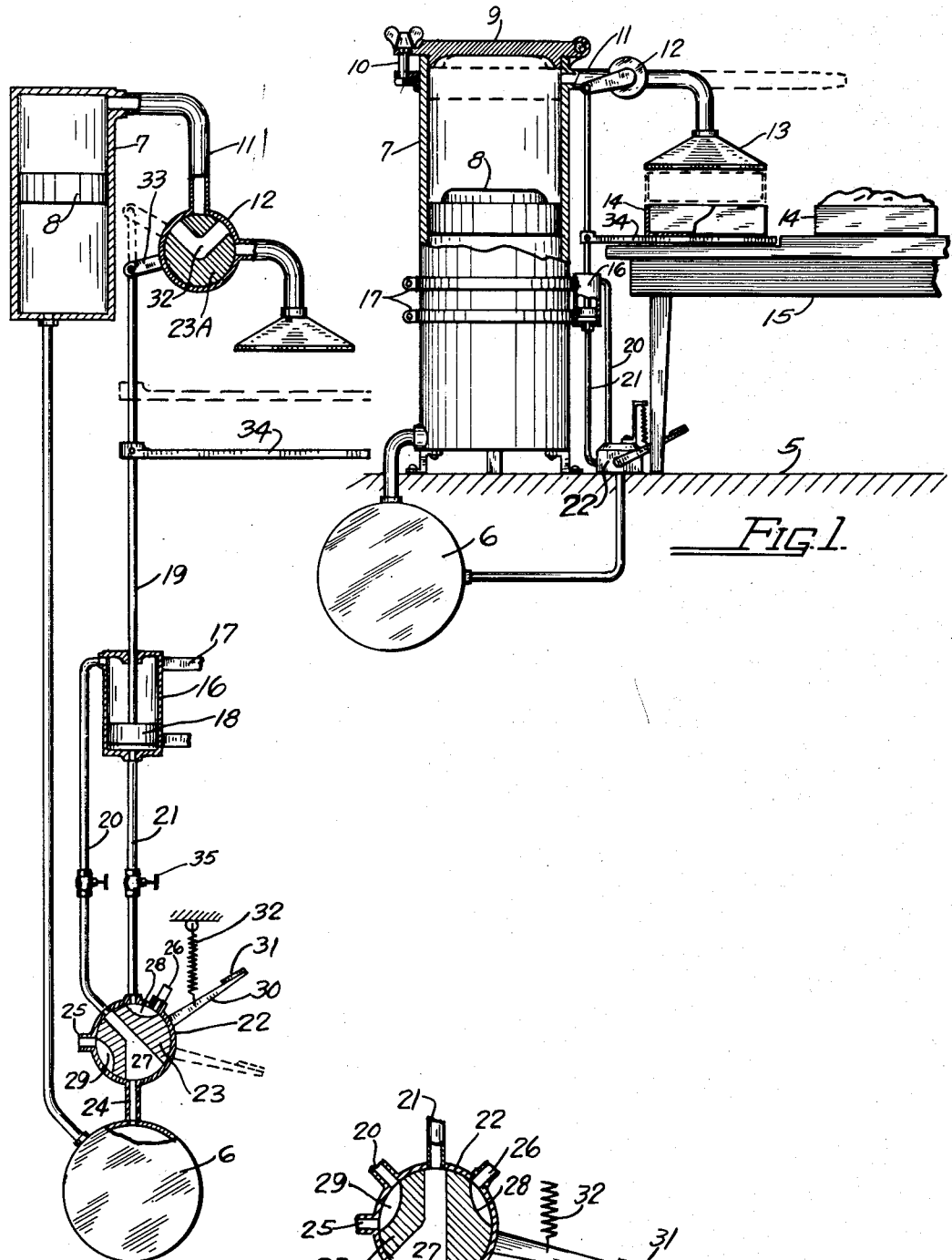
INVENTOR.
Robert H. Clark
BY
Martin E. Anderson
ATTORNEYS

United States Patent Office 2,717,113
Patented Sept. 6, 1955

2,717,113

ATTACHMENT FOR SAUSAGE STUFFING MACHINES

Robert H. Clark, Denver, Colo.

Application January 24, 1952, Serial No. 267,984

1 Claim. (Cl. 226—125)

This invention relates to improvements in machines of the type used for filling containers with materials that have no inherent flow characteristics such as ground meat, ground cheese and the like.

This invention although it may be used for other purposes is intended primarily for use with the handling and packing of ground meat and will be described in this relation.

Meat processors and handlers who make sausages and other ground meat materials are, as a rule, provided with machines usually referred to by the name of "sausage stuffers." Such machines in addition to their use in filling sausage casings with ground meat are also used for filling containers such as pans and the like with meat.

The ordinary "sausage stuffer" is a simple machine consisting of a large cylinder provided with a floating piston, the cylinder is positioned with its axis vertical, the ground meat is put into the part above the piston and confined therein by a removable lid or cover. A discharge tube has its upper end in communication with the interior near the top of the cylinder and is provided with a stop cock or valve that controls the flow of material. The space below the piston is in communication with a source of compressed air which urges the piston upwardly. Whenever the valve in the discharge pipe is opened ground meat is extruded and flows into the sausage casings or other container to be filled.

When this machine is used for filling pans or other containers its operation is slow if controlled by a single operator and therefore two persons are usually employed.

It is the object of this invention to produce a device in the form of an attachment by means of which the ordinary sausage stuffing machine can be converted at a small expense into a semi-automatic machine that can be operated by a single person and at an increased rate.

The attachment that forms the subject of the invention will now be described in detail for which purpose reference will be had to the accompanying drawing in which it has been illustrated and in which:

Figure 1 is a side elevation of a sausage stuffing machine showing the attachment in place thereon;

Figure 2 is a diagrammatic view showing the relationship of the several elements, and Figure 3 is a view showing another position of its control valve.

Referring now to the drawing reference numeral 5 designates the floor on which the machine is supported and 6 represents a cylinder containing compressed air. The air in the cylinder is replenished by an air pump and kept at a predetermined pressure by well known means (not shown). Resting on the floor is a larger cylinder 7 such as is now in common use in sausage stuffing machines. Within the cylinder is a piston 8 which will be referred to as a floating piston because it has no outside connections but floats on compressed air. The top of cylinder 7 has a removable lid 9 held in place by suitable means such as a number of angularly spaced lugs and bolts which have been indicated by numeral 10. The cover may be connected with the cylinder by a hinge if desired. Normally piston 8 is resting on the bottom of cylinder 7 and while it is in that position the space above is filled with ground meat and the cover latched in the closed position shown.

A discharge pipe 11 is connected with the interior of the cylinder near its upper end. A metering valve 12 is positioned in pipe 11 and the latter extends beyond the valve and terminates in a nozzle 13. Various types of nozzles may be used and the one shown is illustrative only and shows the nozzle usually employed in filling pans 14. A table 15 is ordinarily positioned adjacent the machine as shown in the drawing but forms no part of the mechanism.

The parts that have been described are all present in the ordinary sausage stuffing machine in which valve 12 is manually operated.

When pans are to be filled with ground meat they are held underneath nozzle 13 in the dotted line position, the operator employs one hand for supporting the pan and the other to operate the metering valve.

It has been found that one operator cannot long operate the machine alone and it is therefore customary to employ two operators for each machine.

It is the object of this invention to produce an attachment that converts the machine into a semi-automatic one thereby increasing its capacity and permits one operator to do the work formerly requiring two.

The attachment consists of a power cylinder 16 that is clamped in position on cylinder 7 by straps 17. A piston 18 is positioned in the power cylinder and has a piston rod 19 that extends upwardly to and is operatively connected with the metering valve in a manner that will presently be explained. Two pipes, 20 and 21, connect opposite ends of cylinder 16 with an air control valve which consists of a valve housing 22 in which is a cylindrical plug 23. The housing is connected with the compressed air by a pipe 24 and at a diametrically positioned point with pipe 21. The valve housing has two exhaust ports 25 and 26. Plug 23 has a diametrical opening 27 that is circumferentially widened at its lower end and is also provided with two notches 28 and 29 as shown. A pedal arm 30 is connected with plug 23 and permits the plug to be turned from its normal position, shown in Figure 2, to the position shown in Figure 3, by foot pressure exerted on plate 31. A spring 32 serves to hold pedal 30 in the normal position shown in Figure 2.

When plug 23 is positioned as shown in Figure 2 air from cylinder 6 is connected to cylinder 16 above the piston and holds the latter in its lowermost position. When the operator applies foot pressure to plate 31 and moves it into the position shown in Figure 3 air pressure is applied to the under side of piston 18 and air from the cylinder space above the piston exhausts through port 25. It is now evident that the operator can control the movement of piston 18 and piston rod 19. The distance the piston rod moves is determined by the distance the piston can move. Certain stops, not shown, are provided to limit the angular movement of pedal 30.

Valve 12 is constructed in a manner analogous to valve 22 and has a plug 23A that has an angular opening 32. When plug 23A is in the position shown flow of material through pipe 11 is prevented but when this plug is turned 90 degrees material can flow. Plug 23A has an arm 33 to the end of which piston rod 19 is pivotally connected. The parts are so proportioned that when piston 18 is at the top of cylinder 16 valve 12 is open and it will close shortly after rod 19 begins its downward movement.

Supported from rod 19 is a table 34 on which the pan to be filled is positioned as shown by full lines in Figure 1.

When the operator changes the air control valve from the position shown in Figure 2 to that shown in Figure 3 table 34 brings the pan up against the under side of nozzle 13 and at the same time opens valve 12 permitting material to flow through pipe 11 from the cylinder 7 into the pan. As soon as pan 14 is full the operator releases his pressure on pedal 31 and valve 22 returns to the position shown in Figure 2, the full pan is then moved to the right as shown in Figure 1 and an empty pan placed on table 34.

Pipes 20 and 21 are preferably provided with needle valves 35 whereby the speed at which piston 18 will move can be controlled.

The several parts have been shown diagrammatically and it is to be understood that suitable valves that perform the desired functions will be selected. It is further to be understood that valves may be provided wherever necessary or desirable.

From the above it will be seen that an ordinary sausage stuffing machine can be readily converted to semi-automatic operation and that when so converted one operator can do as much or more work than two formerly did and do it with less expenditure of energy.

What is claimed as new is:

A ground meat paste dispensing device of the type having an elongated vertical cylinder open at the top and closed at the bottom, a floating piston in the cylinder, a removable cover attached to the top of the cylinder in sealing relation thereto, the chamber above the piston forming a receptacle for the material to be dispensed, the chamber below the piston forming a compressed air receiving chamber, a materials discharge pipe in communication with the upper chamber adjacent the upper end thereof, a discharge valve in said pipe, a source of air under pressure, a pipe communicating the air pressure source with the chamber beneath the floating piston to thereby place the contents on the upper chamber under sufficient pressure to cause it to flow through the discharge pipe when the discharge valve therein is open; in combination with the above, means for opening and closing the discharge valve by power derived from the compressed air comprising, a power cylinder positioned below the discharge valve, a piston slidable in said cylinder, a piston rod operatively interconnecting the power piston with the discharge valve to move the latter to open position when the power piston approaches its upper limit of travel, means comprising a manually controllable valve of the slide valve type and cooperating conduits, for alternately communicating opposite sides of the power piston with the said air supply and with the atmosphere, to move the said piston and the discharge valve at will to either of their extreme positions, spring means operatively associated with the slide valve forming means to normally hold it in discharge valve closed position, and a table carried by the piston rod at a point below the outlet end of the discharge pipe for holding a vessel in position to receive extruded material during the time that the discharge valve is open and to lower the table and hold it in its lowermost position during the times that the discharge valve is closed.

References Cited in the file of this patent

UNITED STATES PATENTS

| 814,009 | Armentrout | Mar. 6, 1906 |
| 1,320,976 | Black | Nov. 4, 1919 |
| 2,533,641 | Vergobbi | Dec. 12, 1950 |

FOREIGN PATENTS

| 10,190 | Great Britain | May 15, 1902 |